United States Patent
Kim et al.

(10) Patent No.: US 11,059,956 B2
(45) Date of Patent: Jul. 13, 2021

(54) ORGANIC-INORGANIC COMPOSITE FOR RUBBER REINFORCEMENT, METHOD FOR PREPARING THE SAME, AND RUBBER COMPOSITION FOR TIRES COMPRISING THE SAME

(71) Applicant: LG Chem, Ltd., Seoul (KR)

(72) Inventors: Woo Seok Kim, Daejeon (KR); Shin Hee Jun, Daejeon (KR); Ha Na Lee, Daejeon (KR); Kwon Il Choi, Daejeon (KR); Myounghwan Oh, Daejeon (KR)

(73) Assignee: LG Chem, Ltd. (KR)

( * ) Notice: Subject to any disclaimer, the term of this patent is extended or adjusted under 35 U.S.C. 154(b) by 109 days.

(21) Appl. No.: 16/462,108

(22) PCT Filed: Jan. 5, 2018

(86) PCT No.: PCT/KR2018/000271
§ 371 (c)(1),
(2) Date: May 17, 2019

(87) PCT Pub. No.: WO2018/182147
PCT Pub. Date: Oct. 4, 2018

(65) Prior Publication Data
US 2020/0131341 A1   Apr. 30, 2020

(30) Foreign Application Priority Data

Mar. 27, 2017 (KR) .................. 10-2017-0038552

(51) Int. Cl.
| | | |
|---|---|---|
| *C08K 9/06* | (2006.01) | |
| *C08K 3/34* | (2006.01) | |
| *C08L 9/06* | (2006.01) | |
| *C09C 1/40* | (2006.01) | |

(52) U.S. Cl.
CPC .................. *C08K 9/06* (2013.01); *C08K 3/34* (2013.01); *C08L 9/06* (2013.01); *C09C 1/405* (2013.01); *C01P 2002/88* (2013.01); *C01P 2004/64* (2013.01); *C01P 2006/12* (2013.01); *C08K 2201/005* (2013.01); *C08K 2201/006* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 3,015,369 A * | 1/1962 | Brennan | B01J 20/186 |
| | | | 95/129 |
| 4,988,757 A | 1/1991 | Wason | |
| 5,534,599 A | 7/1996 | Sandstrom et al. | |
| 5,538,671 A | 7/1996 | Morrall | |
| 5,580,919 A | 12/1996 | Agostini et al. | |
| 5,961,943 A | 10/1999 | Komatsu et al. | |
| 10,793,441 B2 * | 10/2020 | Choi | C01B 33/26 |
| 2002/0173560 A1 | 11/2002 | Thielen | |
| 2003/0069332 A1 | 4/2003 | Agostini et al. | |
| 2006/0009564 A1 | 1/2006 | Simonot et al. | |
| 2011/0201126 A1 * | 8/2011 | Hughes | H01J 49/0422 |
| | | | 436/175 |
| 2012/0165477 A1 | 6/2012 | Ko et al. | |
| 2013/0217819 A1 | 8/2013 | Buri et al. | |
| 2015/0376380 A1 | 12/2015 | Colvin et al. | |

FOREIGN PATENT DOCUMENTS

| | | | |
|---|---|---|---|
| GB | 1237844 | * | 6/1971 |
| JP | H08502785 A | | 3/1996 |
| JP | H1088028 A | | 4/1998 |
| JP | H1095608 A | | 4/1998 |
| JP | H11348513 A | | 12/1999 |
| JP | 2002293994 A | | 10/2002 |
| JP | 2006510766 A | | 3/2006 |
| JP | 4633471 B2 | | 2/2011 |
| JP | 2013056984 A | | 3/2013 |
| KR | 960034288 A | | 10/1996 |
| KR | 20040035953 A | | 4/2004 |
| KR | 20130048219 A | | 5/2013 |
| WO | WO 2005/054340 A1 | * | 6/2005 |
| WO | 2016174628 A1 | | 11/2016 |

OTHER PUBLICATIONS

English abstract of CN 104877349 A, Sep. 21, 2015, China, 7 pages.*
Extended European Search Report including Written Opinion for Application No. EP18777312.2 dated Jan. 21, 2020.
Cichomski, et al., "Influence of Physical and Chemical Polymer-Filler Bonds on Wet Skid Resistance and Related Properties of Passenger Car Tire Treads", InDeutsche Kautschuk-Tagung, Jul. 2012, 15 pages.
International Search Report for PCT/KR2018/000271, dated May 8, 2018.
Medpelli, D., "New Nanostructured Aluminosilicates from Geopolymer Chemistry", Doctoral Dissertation, Arizona State University, 2015, 192 pages.
Noordermeer, et al., "Filler—Coupling Agent—Polymer Interactions and Their Significance for Tire Performance: Mechanical Engineering on a Molecular Scale", TRC Symposium University of Twente, Nov. 2015, 26 pages.
Sae-Oui, et al., "Roles of Silane Coupling Agents on Properties of Silica-Filled Polychlorrprene", European Polymer Journal, vol. 42, No. 3, Mar. 2006, pp. 479-486.

* cited by examiner

Primary Examiner — Tae H Yoon
(74) Attorney, Agent, or Firm — Lerner, David, Littenberg, Krumholz & Mentlik, LLP

(57) ABSTRACT

The present disclosure relates to an organic-inorganic composite for rubber reinforcement, a method for preparing the same, and a rubber composition for tires including the same. The organic-inorganic composite for rubber reinforcement according to the present disclosure exhibits excellent dispersibility in the rubber composition and reinforcing effect, and thus can be suitably used for eco-friendly tires requiring high efficiency and high fuel efficiency characteristics.

8 Claims, 3 Drawing Sheets

【FIG. 1】
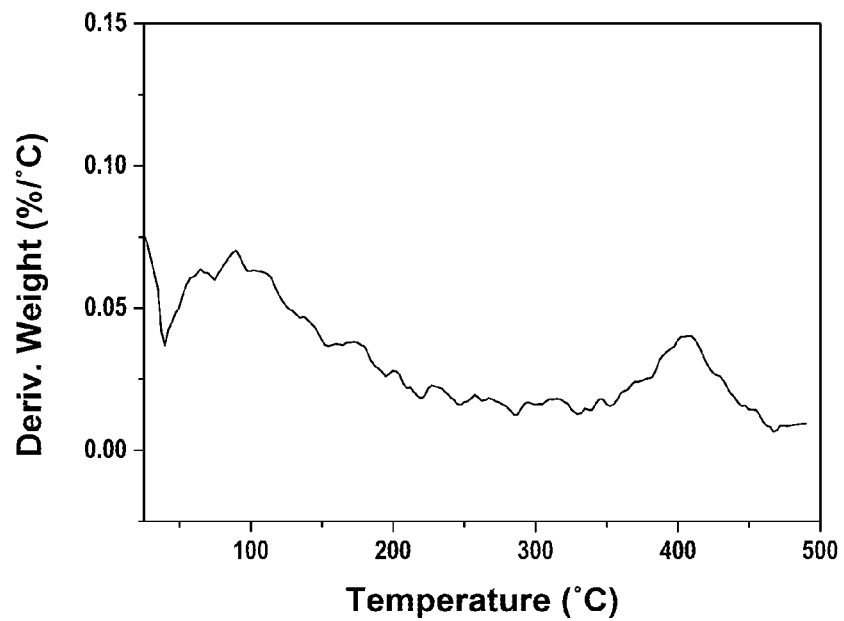
【FIG. 2】
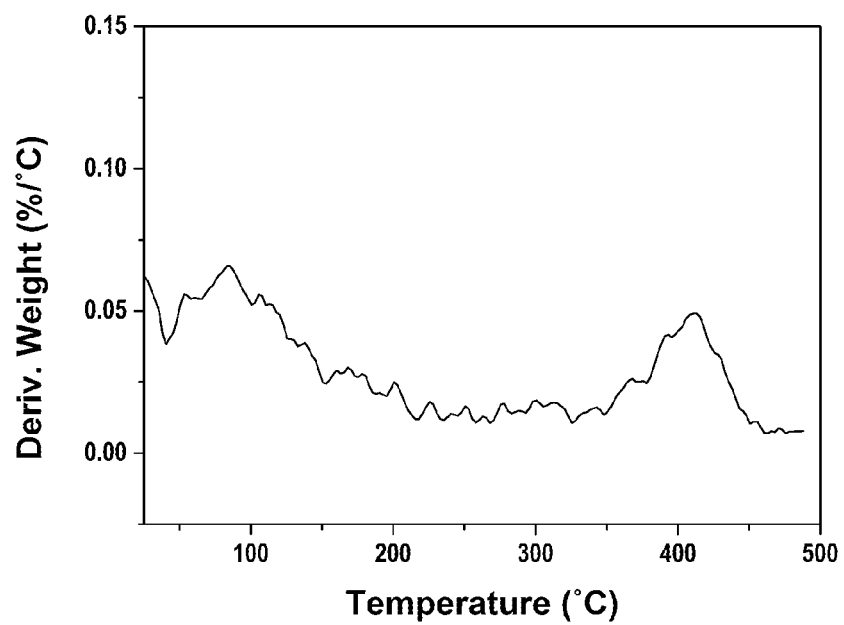

[FIG. 3]
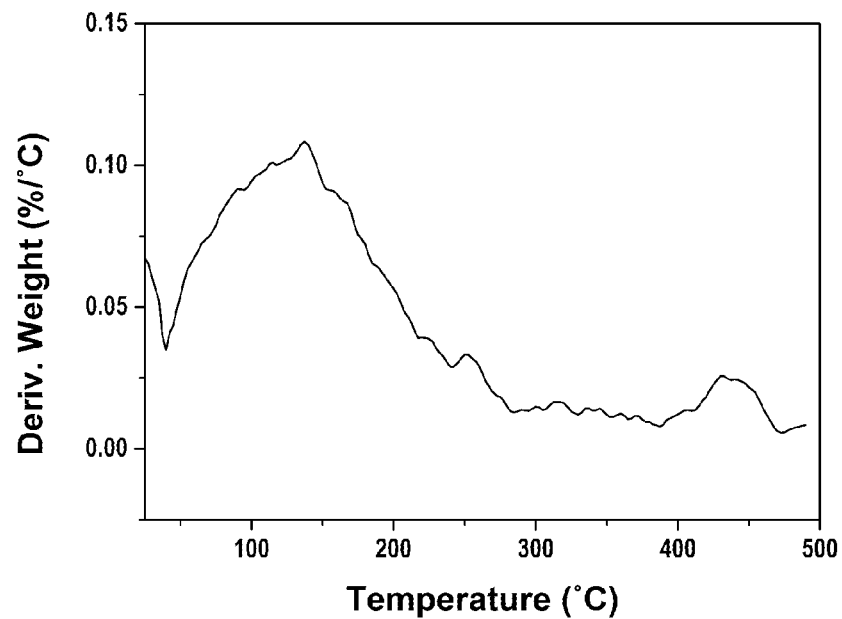
[FIG. 4]
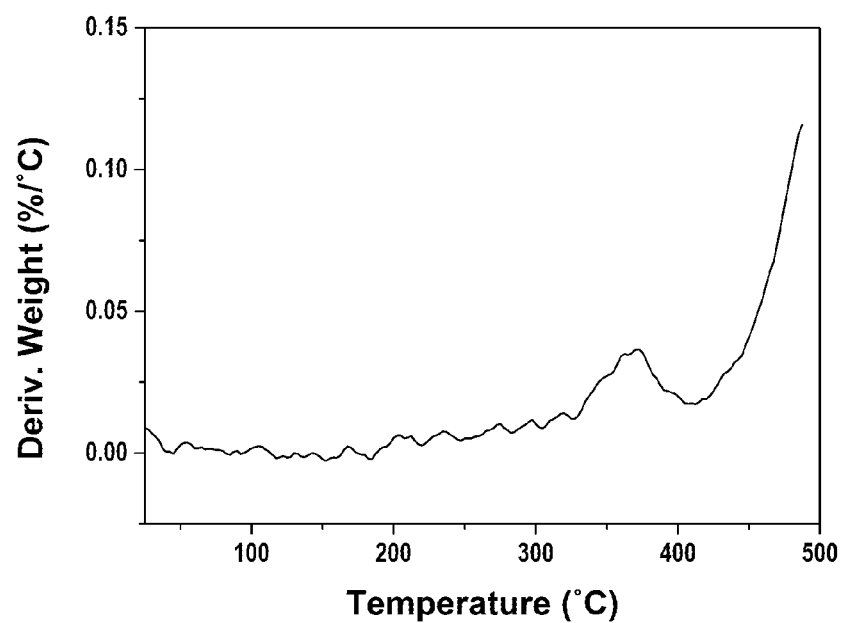

[FIG. 5]
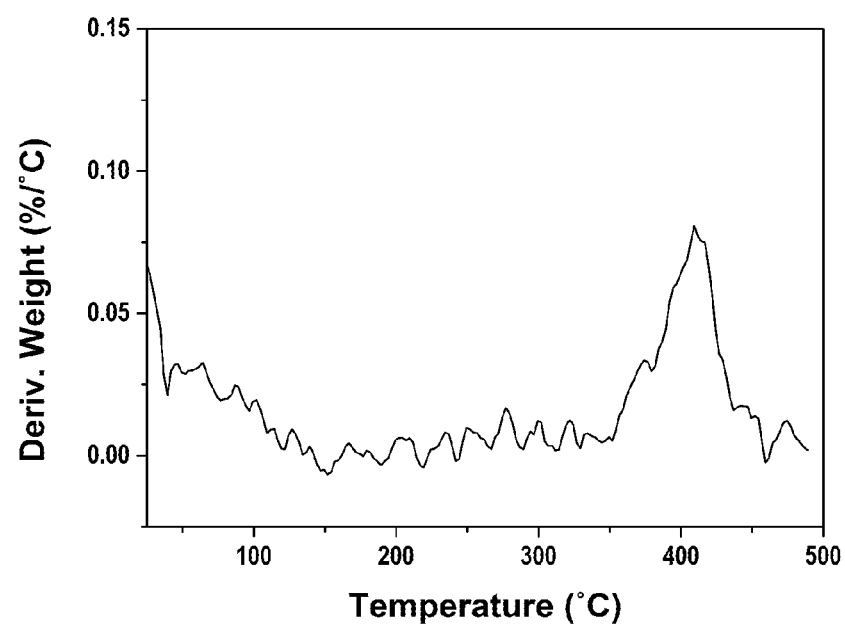

ORGANIC-INORGANIC COMPOSITE FOR RUBBER REINFORCEMENT, METHOD FOR PREPARING THE SAME, AND RUBBER COMPOSITION FOR TIRES COMPRISING THE SAME

CROSS-REFERENCE TO RELATED APPLICATION

The present application is a national phase entry under 35 U.S.C. § 371 of International Application No. PCT/KR2018/000271, filed on Jan. 5, 2018, which claims the benefits of Korean Patent Application No. 10-2017-0038552, filed on Mar. 27, 2017, the disclosures of which are incorporated herein by reference.

TECHNICAL FIELD

The present disclosure relates to an organic-inorganic composite for rubber reinforcement, a method for preparing the same, and a rubber composition for tires including the same.

BACKGROUND OF ART

As concerns about global warming and environmental problems spread, environment-friendly concepts for increasing energy efficiency and reducing carbon emissions have attracted attention in various fields. These environment-friendly concepts are becoming evident in the tire industry by developing highly efficient eco-friendly tires and recycling waste tires.

Eco-friendly tires (or green tires) are tires that can reduce rolling resistance of rubber to achieve high efficiency and high fuel efficiency, resulting in a reduction in carbon emissions. Modified rubber materials and rubber reinforcing white additives (for example, precipitated silica) have been mainly used for manufacturing such eco-friendly tires.

Generally, silica materials have a problem that dispersibility in the rubber composition is low so that abrasion resistance is deteriorated. In order to compensate for this, it is known that a highly dispersed precipitated silica having specific conditions can be used together with a silane coupling agent to make a material for eco-friendly tires having good abrasion resistance.

On the other hand, there is also a high interest in additives such as the highly dispersed precipitated silica which may have good conflicting properties (mechanical strength such as rolling resistance and abrasion resistance). It is known that even when alumina, clay, kaolin, or the like is applied as the rubber reinforcing white additive, it can be used as an eco-friendly tire material by lowering rolling resistance. However, the rubber reinforcing white additive has a problem that the dispersibility decreases due to formation of a strong aggregate and the like, resulting in problems such as deterioration of mechanical strength.

DETAILED DESCRIPTION OF THE INVENTION

Technical Problem

The present disclosure is to provide an organic-inorganic composite for rubber reinforcement exhibiting excellent dispersibility and improved reinforcing effect in a rubber composition.

The present disclosure is to provide a method for preparing the organic-inorganic composite for rubber reinforcement.

The present disclosure is to provide a rubber composition for tires including the organic-inorganic composite for rubber reinforcement.

Technical Solution

According to the present disclosure, an organic-inorganic composite for rubber reinforcement includes amorphous aluminosilicate particles having a composition of the following Chemical Formula 1 and a silane-based coupling agent bonded to at least a part of a surface of aluminosilicate particles, wherein the organic-inorganic composite satisfies the following Equation 1:

$$M_{x/n}[(AlO_2)_x(SiO_2)_y] \cdot m(H_2O) \quad \text{[Chemical Formula 1]}$$

wherein, in Chemical Formula 1,
M is an element selected from the group consisting of Li, Na, K, Rb, Cs, Be, and Fr, or an ion thereof;
x>0, y>0, n>0, and m≥0;
1.0≤y/x≤10.0; and
0.01≤x/n≤1.2;

$$Da \geq 3.0 \quad \text{[Equation 1]}$$

wherein, in Equation 1,
Da is an area under a derivative thermogravimetric curve over a temperature range of 300° C. to 500° C., wherein the derivative thermogravimetric curve is in units of weight reduction percent of the organic-inorganic composite relative to temperature (%/° C.), wherein the derivative thermogravimetric curve is obtained from thermogravimetric analysis (TGA) of the organic-inorganic composite, wherein, in TGA, weight of the organic-inorganic composite is measured as a function of temperature over a temperature ranging from 30° C. to 500° C. The derivative thermogravametric curve, which is the change in weight to change in temperature (dm/dT), can be determined from these measurements.

According to the present disclosure, a method for preparing the organic-inorganic composite for rubber reinforcement, including the steps of:
preparing amorphous aluminosilicate particles having a composition represented by the Chemical Formula 1, a silane-based coupling agent, and an organic solvent having a boiling point of 150° C. or higher and which is not reactive therewith;
heating the amorphous aluminosilicate particles and the organic solvent to 130 to 150° C. while mixing them;
adding the silane-based coupling agent to the heated mixture and stirring for 10 to 60 minutes to form an organic-inorganic composite having the silane-based coupling agent bound to at least a part of a surface of the amorphous aluminosilicate particles; and
washing and drying the organic-inorganic composite, is provided.

According to the present disclosure, a rubber composition for tires, including the organic-inorganic composite for rubber reinforcement of Claim 1 and at least one diene elastomer, is provided.

Hereinafter, the organic-inorganic composite for rubber reinforcement, the method for preparing the same, and the rubber composition for tires including the same according to the exemplary embodiments of the present disclosure will be described in more detail.

In this specification, the terms are used merely to refer to specific embodiments, and are not intended to restrict the present disclosure unless that is explicitly expressed.

Singular expressions of the present disclosure may include plural expressions unless that is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

I. The Reinforcing Material for Rubber

An embodiment of the present disclosure provides an organic-inorganic composite for rubber reinforcement, including amorphous aluminosilicate particles having a composition of the following Chemical Formula 1 and a silane-based coupling agent bonded to at least a part of a surface of aluminosilicate particles, wherein the following Equation 1 is satisfied:

    [Chemical Formula 1]

wherein, in Chemical Formula 1,

M is an element selected from the group consisting of Li, Na, K, Rb, Cs, Be, and Fr, or an ion thereof;

x>0, y>0, n>0, and m≥0;

1.0≤y/x≤10.0; and 0.01≤x/n≤1.2;

Da≥3.0    [Equation 1]

wherein, in Equation 1,

Da is an area under a derivative thermogravimetric curve over a temperature range of 300° C. to 500° C., wherein the derivative thermogravimetric curve is in units of weight reduction percent of the organic-inorganic composite relative to temperature (%/° C.), wherein the derivative thermogravimetric curve is obtained from thermogravimetric analysis (TGA) of the organic-inorganic composite, wherein, in TGA, weight of the organic-inorganic composite is measured as a function of temperature over a temperature ranging from 30° C. to 500° C. The derivative thermogravametric curve, which is the change in weight to change in temperature (dm/dT), can be determined from these measurements. The area for Da may be determined from the derivative thermogravimetric curve, where an x-axis value [temperature (° C.)] is 300 to 500° C. and a y-axis value [reduction rate of weight (%/C)] is zero (0) or more.

As a result of studies by the present inventors, it was confirmed that the organic-inorganic composite satisfying the above-mentioned characteristics can exhibit an enhanced reinforcing effect due to excellent dispersibility in a rubber composition, but does not hinder processability of the rubber composition. Therefore, the composite can be suitably applied as a reinforcing material for rubber used in a rubber composition for tires.

The organic-inorganic composite may improve a reinforcing effect (in particular, abrasion resistance) and reduce rolling resistance, while exhibiting excellent dispersibility similar to that of silica.

According to the present disclosure, the aluminosilicate particles contained in the organic-inorganic composite are amorphous.

In the amorphous aluminosilicate particles according to the embodiment of the present disclosure, "amorphous" may refer to a full width at half maximum (FWHM) in a 2θ range of 20° to 37° in a data plot obtained by X-ray diffraction (XRD) of 3° to 8.5°.

Preferably, the full width at half maximum (FWHM) is 3° or more, 3.5° or more, 4.00 or more, 4.5° or more, 5.0° or more, 5.5° or more, or 6.0° or more. In addition, preferably, the FWHM is 8.5° or less, 8.0° or less, 7.5° or less, or 7.0° or less.

The full width at half maximum (FWHM) is a numerical value of a peak width at half of the maximum peak intensity in the 2θ range of 20° to 37° obtained by X-ray diffraction of the aluminosilicate particles.

The unit of the full width at half maximum (FWHM) can be expressed in degrees (°) which is the unit of 2θ. Compounds having high crystallinity may have a small FWHM value.

In addition, the amorphous aluminosilicate particles according to the embodiment of the present disclosure are characterized in that a maximum peak intensity ($I_{max}$) is in a 2θ range of 26° to 31 in a data plot obtained by X-ray diffraction (XRD).

Preferably, the maximum peak intensity ($I_{max}$) is in a 2θ range of 26° or more, 27° or more, or 28° or more. In addition, preferably, the maximum peak intensity (Imax) is in a 2θ range of 31 or less, 30.5° or less, or 30° or less.

For reference, amorphous silica shows $I_{max}$ in a 2θ range of 20° to 25° and amorphous alumina shows $I_{max}$ in a 2θ range of 30° to 40°.

In addition, the aluminosilicate particles have a composition of the following Chemical Formula 1:

    [Chemical Formula 1]

wherein, in Chemical Formula 1,

M is an element selected from the group consisting of Li, Na, K, Rb, Cs, Be, and Fr, or an ion thereof;

x>0, y>0, n>0, and m≥0;

1.0≤y/x≤10.0; and 0.01≤x/n≤1.2.

That is, the aluminosilicate particles contain an alkali metal or an ion thereof as a metal element (M) or an ion thereof, and in particular, satisfy a composition of 1.0≤y/x≤10.0 and 0.01≤x/n≤1.2.

Specifically, in Chemical Formula 1, y/x is 1.0 or more, 1.15 or more, 1.3 or more, or 1.45 or more; and is 10.0 or less, 7.5 or less, 5.0 or less, 4.5 or less, 4.0 or less, 3.5 or less, 3.0 or less, 2.5 or less, or 2.0 or less, which may be advantageous for manifesting all of the properties according to the present disclosure.

Specifically, in Chemical Formula 1, x/n is 0.01 or more, 0.05 or more, 0.1 or more, 0.5 or more, 0.55 or more, 0.6 or more, 0.65 or more, 0.7 or more, 0.75 or more, or 0.8 or more; and is 1.2 or less, or 1.15 or less, which may be advantageous for manifesting all of the properties according to the present disclosure.

An average particle diameter of all aluminosilicate particles is 10 to 100 nm, which may be advantageous for manifesting all the properties according to the present disclosure.

Specifically, the average particle diameter of all the aluminosilicate particles is 10 nm or more, 15 nm or more, or 20 nm or more; and is 100 nm or less, 80 nm or less, 60 nm or less, or 50 nm or less.

In general, the smaller the particle diameter of the reinforcing material for rubber, the better the reinforcing effect. However, the smaller the particle diameter, the more easily an aggregation phenomenon occurs between the particles in the rubber composition. If such agglomeration becomes severe, phase separation may occur between the reinforcing material for rubber and the rubber components, resulting in a decrease in processability of tires and a difficulty in achieving the desired reinforcing effect.

The aluminosilicate particles may be in the form of primary particles that are substantially non-aggregated in the rubber composition, while being amorphous particles having the above-mentioned composition.

According to the embodiment of the present disclosure, the aluminosilicate particles are characterized in that a Brunauer-Emmett-Teller surface area ($S_{BET}$) is 80 to 250 m$^2$/g, and an external specific surface area ($S_EXT$) is 60 to 200 m$^2$/g according to an analysis of nitrogen adsorption/desorption, which may be advantageous for manifesting all the properties according to the present disclosure.

Specifically, the $S_{BET}$ is 80 m$^2$/g or more, 85 m$^2$/g or more, 90 m$^2$/g or more, 95 m$^2$/g or more, or 100 m$^2$/g or more; and is 250 m$^2$/g or less, 190 m$^2$/g or less, 180 m$^2$/g or less, 170 m$^2$/g or less, 160 m$^2$/g or less, 150 m$^2$/g or less, 130 m$^2$/g or less, or 110 m$^2$/g or less.

Specifically, the $S_{EXT}$ is 60 m$^2$/g or more, 70 m$^2$/g or more, 80 m$^2$/g or more, or 85 m$^2$/g or more; and is 200 m$^2$/g or less, 180 m$^2$/g or less, 160 m$^2$/g or less, 140 m$^2$/g or less, 120 m$^2$/g or less, or 100 m$^2$/g or less.

Further, the ratio of $S_{BET}$ to $S_{EXT}$ ($S_EXT/S_{BET}$) of the aluminosilicate particles is 0.8 to 1.0, which may be advantageous for manifesting all the properties according to the present disclosure. Specifically, the $S_EXT/S_{BET}$ is 0.80 or more, 0.81 or more, 0.82 or more, 0.83 or more, 0.84 or more, or 0.85 or more; and is 1.0 or less, 0.99 or less, 0.95 or less, or 0.90 or less.

On the other hand, it is preferable that the content of micropores in the inorganic material used as the reinforcing material for rubber is minimized. This is because the micropores act as defects and can deteriorate the physical properties of the reinforcing material for rubber.

According to the present disclosure, the aluminosilicate particles are characterized in that a volume of micropores ($V_{micro}$) having a pore size of less than 2 nm calculated from the $S_{BET}$ by a t-plot method is less than 0.05 cm$^3$/g, which can exhibit excellent mechanical properties as a reinforcing material for rubber. Specifically, the $V_{micro}$ is 0.05 cm$^3$/g or less, 0.025 cm$^3$/g or less, 0.02 cm$^3$/g or less, 0.015 cm$^3$/g or less, 0.01 cm$^3$/g or less, or 0.007 cm$^3$/g or less.

In addition, the aluminosilicate particles may have a particle size distribution which shows a volume average particle diameter ($D_{mean}$) of 1 to 25 μm, a geometric standard deviation of 1 to 20 μm, and a 90% cumulative particle diameter ($D_{90}$) of 1 to 100 μm, when measured under distilled water.

Specifically, the aluminosilicate particles may have a volume average particle diameter ($D_{mean}$) of 1 μm or more, 2.5 μm or more, 5 μm or more, or 7.5 μm or more; and of 25 μm or less, 20 μm or less, or 15 μm or less, when measured under distilled water.

The aluminosilicate particles may have a geometric standard deviation of 1 μm or more, 2.5 μm or more, or 5 μm or more; and of 20 μm or less, 15 or less, or 10 μm or less, when measured under distilled water.

The aluminosilicate particles may have a 90% cumulative particle diameter ($D_{90}$) of 1 μm or more, 5 μm or more, or 10 μm or more; and of 100 μm or less, 50 μm or less, 25 μm or less, or 20 μm or less, when measured under distilled water.

Meanwhile, the organic-inorganic composite for rubber reinforcement includes a silane-based coupling agent bonded to at least a part of a surface of the amorphous aluminosilicate particles.

The coupling agent is well known as a binder for providing chemical or physical bonding between an inorganic filler such as aluminosilicate and an elastomer such as a rubber. The coupling agent is at least bifunctional, and includes a functional group binding to the inorganic filler and a functional group binding to the elastomer.

In the present disclosure, known coupling agents can be applied without particular limitation, and a silane-based coupling agent may preferably be used.

The silane-based coupling agent is bonded to at least a part of a surface of the amorphous aluminosilicate particles to form the organic-inorganic composite, thereby enabling the improved rubber reinforcing effect of the composite.

As a silane-based coupling agent, at least one compound selected from the group consisting of bis(3-triethoxysilylpropyl) tetrasulfide, bis(2-triethoxysilylethyl) tetrasulfide, bis(4-triethoxysilylbutyl) tetrasulfide, bis(3-trimethoxysilylpropyl) tetrasulfide, bis(2-trimethoxysilylethyl) tetrasulfide, bis(4-trimethoxysilylbutyl) tetrasulfide, bis(3-triethoxysilylpropyl) trisulfide, bis(2-triethoxysilylethyl) trisulfide, bis(4-triethoxysilylbutyl) trisulfide, bis(3-trimethoxysilylpropyl) trisulfide, bis(2-trimethoxysilylethyl) trisulfide, bis(4-trimethoxysilylbutyl) trisulfide, bis(3-triethoxysilylpropyl) disulfide, bis(2-triethoxysilylethyl) disulfide, bis(4-triethoxysilylbutyl) disulfide, bis(3-trimethoxysilylpropyl) disulfide, bis(2-trimethoxysilylethyl) disulfide, bis(4-trimethoxysilylbutyl) disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropyl benzothiazole tetrasulfide, 3-trimethoxysilylpropyl methacrylate monosulfide, and 3-trimethoxysilylpropyl methacrylate monosulfide may be included.

Further, the organic-inorganic composite for rubber reinforcement satisfies the following Equation 1:

$$Da \geq 3.0 \qquad \text{[Equation 1]}$$

wherein, in Equation 1,

Da is an area under a derivative thermogravimetric curve over a temperature range of 300° C. to 500° C., wherein the derivative thermogravimetric curve is in units weight reduction percent of the organic-inorganic composite relative to temperature (%/° C.), wherein the derivative thermogravimetric curve is obtained from thermogravimetric analysis (TGA) of the organic-inorganic composite, wherein, in TGA, weight of the organic-inorganic composite is measured as a function of temperature over a temperature ranging from 30° C. to 500° C. The area for Da may be determined from the derivative thermogravimetric curve, where an x-axis value [temperature (° C.)] is 300 to 500° C. and a y-axis value [reduction rate of weight (%/° C.)] is zero (0) or more, in a derivative thermogravimetric curve (dm/dt) obtained by thermogravimetric analysis (TGA) of the organic-inorganic composite.

As the organic-inorganic composite for rubber reinforcement includes the amorphous aluminosilicate particles and the silane-based coupling agent, excellent dispersibility and improved reinforcing effect (in particular, abrasion resistance) can be exhibited in a rubber composition. In order for the organic-inorganic composite to exhibit the above-mentioned characteristics in a rubber composition for tires, the following Equation 1 should be satisfied.

For example, FIG. 1 is a graph showing a derivative thermogravimetric curve (hereinafter referred to as a "DTG curve") obtained by thermogravimetric analysis (TGA) of the organic-inorganic composite of Example 1 according to the present disclosure.

The DTG curve can be obtained by converting data measured by thermogravimetric analysis. The x-axis value is a temperature (° C.) and the y-axis value is a reduction rate of weight with temperature (%/° C.).

In the DTG curve of the organic-inorganic composite, a desorption temperature and a desorption amount can be determined by confirming the position and area of a peak where intrinsic moisture and the coupling agent bonded to the aluminosilicate particles are desorbed.

For example, in FIG. 1, peaks appearing in a region where the x-axis value is 50 to 200° C. are related to the intrinsic moisture contained in the aluminosilicate particles, and peaks appearing in a range of 300 to 500° C. are related to the silane-based coupling agent contained in the organic-inorganic composite.

Since the amorphous aluminosilicate particles and the silane-based coupling agent are excellent in bonding and a large amount of the silane-based coupling agent is contained, the organic-inorganic composite for rubber reinforcement can satisfy Equation 1 (Da≥3.0).

Preferably, the organic-inorganic composite for rubber reinforcement may have the Da value of 3.0 or more, 3.5 or more, 3.7 or more, 3.8 or more, 3.85 or more, 3.88 or more, 4.0 or more, or 4.2 or more.

When the Da value is less than 3.0, physical properties (in particular, abrasion resistance of rubber molded products) required as the rubber reinforcing material for the organic-inorganic composite cannot be achieved, so that it is difficult to apply the same to the rubber composition for tires.

II. The Method for Preparing the Aluminosilicate Particles

Another embodiment of the present disclosure provides a method for preparing the organic-inorganic composite for rubber reinforcement, including the steps of:

preparing amorphous aluminosilicate particles having a composition represented by the Chemical Formula 1, a silane-based coupling agent, and an organic solvent having a boiling point of 150° C. or higher and which is not reactive therewith;

heating the amorphous aluminosilicate particles and the organic solvent to 130 to 150° C. while mixing them;

adding the silane-based coupling agent to the heated mixture and stirring for 10 to 60 minutes to form an organic-inorganic composite having the silane-based coupling agent bound to at least a part of a surface of the amorphous aluminosilicate particles; and washing and drying the organic-inorganic composite.

First, amorphous aluminosilicate particles having a composition represented by the Chemical Formula 1, a silane-based coupling agent, and an organic solvent having a boiling point of 150° C. or higher and which is not reactive therewith are prepared.

According to an embodiment of the present disclosure, the amorphous aluminosilicate particles having a composition of Chemical Formula 1 may be prepared by a method including the steps of:

[i] adding silicon sources, aluminum sources, and water to a basic or alkaline solution (for example, a sodium hydroxide solution) and stirring to form an Al—O—Si structure of a monomer unit satisfying a specific metal atomic ratio;

[ii] curing the aluminosilicate monomer at a low temperature (for example, from room temperature to 90° C.) and atmospheric pressure for 3 to 24 hours to cause an Al—O—Si polymerization reaction;

[iii] washing and drying the polymerized aluminosilicate particles; and

[iv] crushing the dried aluminosilicate particles to control particle size distribution.

The aluminosilicate particles satisfying all of the above characteristics can be obtained by controlling the type of reactants, the molar ratio of reactants, and the reaction conditions to be applied to the formation of the monomer unit in the method.

All the properties of the amorphous aluminosilicate particles are replaced with those described in I. The organic-inorganic composite for rubber reinforcement.

In the method, fumed silica, rice husks, colloidal silica, celite, pearlite, rice husk ash, silica fume, organosilane, clay, minerals, meta kaolin, calcined clay, active clay, fly ash, slag, pozzolan, incinerated utility waste, industrial byproducts, glass powder, red mud, or the like may be used as the silicon sources.

In addition, alumina, aluminate, aluminum salts, organic aluminoxane, pearlite, clay, minerals, metakaolin, calcined clay, active clay, fly ash, slag, pozzolan, incinerated utility waste, industrial byproducts, glass powder, red mud, or the like may be used as the aluminum sources.

The silane-based coupling agent is replaced with the contents described in I. The organic-inorganic composite for rubber reinforcement.

The organic solvent should be non-reactive with the amorphous aluminosilicate particles and the silane-based coupling agent. In addition, the organic solvent preferably has a boiling point of 150° C. or more in order to allow sufficient reaction between the amorphous aluminosilicate particles and the silane-based coupling agent.

Specifically, the organic solvent may be at least one compound selected from the group consisting of mesitylene, indane, tetralin, limonene, decane, undecane, and dodecane.

After the above-described components are prepared, the steps of heating the amorphous aluminosilicate particles and the organic solvent to 130 to 150° C. while mixing them, and adding the silane-based coupling agent to the heated mixture and stirring for 10 to 60 minutes, are performed.

Herein, the content of the organic solvent is not particularly limited, and may be adjusted to an amount at which the amorphous aluminosilicate particles and the organic solvent can be sufficiently dispersed and the composite can be easily recovered after completion of the reaction.

In addition, the amorphous aluminosilicate particles and the silane-based coupling agent may preferably be used in a weight ratio of 1:0.01 to 1:0.5, which is advantageous for achieving reaction efficiency and physical properties of the composite.

Preferably, the amorphous aluminosilicate particles and the silane-based coupling agent are used in a weight ratio of 1:0.01 to 1:0.25, 1:0.05 to 1:0.25, 1:0.05 to 1:0.20, or 1:0.05 to 1:0.15.

As a non-limiting example, the above steps may be performed by adding 1.0 g of the amorphous aluminosilicate particles to 20 ml of the organic solvent and then heating 15 to 150° C. while stirring at 500 rpm, and adding 0.08 g of the silane-based coupling agent thereto, followed by stirring for 20 minutes while maintaining the temperature at 150° C.

By performing the above steps, an organic-inorganic composite having the silane-based coupling agent bound to at least a part of a surface of the amorphous aluminosilicate particles is formed.

Then, the organic-inorganic composite may be washed and dried by a conventional method.

III. The Rubber Composition for Tires

According to another embodiment of the present disclosure, a rubber composition for tires including the organic-inorganic composite for rubber reinforcement is provided.

The organic-inorganic composite satisfying the above-mentioned characteristics can exhibit an enhanced reinforcing effect due to excellent dispersibility in the rubber composition, but does not hinder processability of the rubber composition. Therefore, the composite can be suitably applied as a reinforcing material for rubber used in a rubber composition for tires.

In particular, the above-mentioned organic-inorganic composite can exhibit excellent mechanical properties (for example, excellent durability, abrasion resistance, compressive strength, etc.) in a rubber composition by satisfying the above-mentioned composition and Equation 1.

The rubber composition for tires may include a general diene elastomer without any particular limitation.

For example, the diene elastomer may be at least one compound selected from the group consisting of a natural rubber, polybutadiene, polyisoprene, a butadiene/styrene copolymer, a butadiene/isoprene copolymer, a butadiene/acrylonitrile copolymer, an isoprene/styrene copolymer, and a butadiene/styrene/isoprene copolymer.

In addition, plasticizers, pigments, antioxidants, ozone deterioration inhibitors, vulcanization accelerators, and the like which are commonly used in the tire industry may be added to the rubber composition for tires.

Advantageous Effects

The organic-inorganic composite for rubber reinforcement according to the present disclosure exhibits excellent dispersibility in the rubber composition and reinforcing effect, and thus can be suitably used for eco-friendly tires requiring high efficiency and high fuel efficiency characteristics.

BRIEF DESCRIPTION OF THE DRAWINGS

FIG. 1 is a graph showing a derivative thermogravimetric curve obtained by thermogravimetric analysis (TGA) of the organic-inorganic composite of Example 1.

FIG. 2 is a graph showing a derivative thermogravimetric curve obtained by thermogravimetric analysis (TGA) of the organic-inorganic composite of Example 2.

FIG. 3 is a graph showing a derivative thermogravimetric curve obtained by thermogravimetric analysis (TGA) of the organic-inorganic composite of Comparative Example 1.

FIG. 4 is a graph showing a derivative thermogravimetric curve obtained by thermogravimetric analysis (TGA) of the organic-inorganic composite of Comparative Example 2.

FIG. 5 is a graph showing a derivative thermogravimetric curve obtained by thermogravimetric analysis (TGA) of the organic-inorganic composite of Control Example.

DETAILED DESCRIPTION OF THE EMBODIMENTS

Hereinafter, preferred examples are provided for better understanding. However, these examples are for illustrative purposes only, and the invention is not intended to be limited by these examples.

Synthesis Example 1

(Preparation of Amorphous Aluminosilicate Particles)

23 g of KOH (Daejung Chemicals & Metals) and 27 g of colloidal silica (Ludox HS 30 wt %, Sigma-Aldrich) were completely dissolved in 22 ml of distilled water (DW). 15 g of metakaolin ($Al_2Si_2O_7$, Aldrich) was added to the solution, followed by mixing at 600 rpm for 40 minutes using an overhead stirrer.

This was cured at a temperature of about 70° C. for 4 hours.

The cured solid product was added into distilled water at 90° C., stirred for 12 hours, and centrifuged to wash it to about pH 7.

The washed solid product was dried in an oven at 70° C. for 24 hours to finally obtain aluminosilicate particles (primary particle diameter of 30 nm).

Synthesis Example 2

(Preparation of Crystalline Aluminosilicate Particles)

12 g of NaOH (Daejung Chemicals & Metals) and 31 g of a $Na_2SiO_5$ solution (Aldrich) were completely dissolved in 22 ml of distilled water (DW). 15 g of metakaolin ($Al_2Si_2O_7$, Aldrich) was added to the solution, followed by mixing at 800 rpm for 40 minutes using an overhead stirrer.

This was cured at room temperature of about 25° C. for 24 hours.

The cured product was added into distilled water at 90° C., stirred for 12 hours, and centrifuged to wash it to about pH 7.

The washed solid product was dried in an oven at 70° C. for 24 hours to finally obtain aluminosilicate particles (primary particle diameter of 150 nm).

Experimental Example 1

(1) The average particle diameter and composition of the aluminosilicate particles according to Synthesis Examples 1 and 2 were confirmed using scanning electron microscopy (SEM) and energy dispersive X-ray spectroscopy (EDS).

As a result, it was confirmed that the aluminosilicate particles of Synthesis Example 1 had a composition of y/x=1.6 and x/n=1.12 in Chemical Formula 1. Also, it was confirmed that the aluminosilicate particles of Synthesis Example 2 had a composition of y/x=1.31 and x/n=0.91 in Chemical Formula 1.

(2) The nitrogen adsorption/desorption Brunauer-Emmett-Teller surface area ($S_{BET}$) and the external specific surface area ($S_{EXT}$) were measured for the particles according to Examples 1 and 2 using a specific surface area analyzer (BEL Japan Inc., BELSORP_MAX). Then, the volume of micropores ($V_{micro}$) having a pore size of less than 2 nm was calculated from the $S_{BET}$ by a t-plot method.

TABLE 1

| | Primary particle diameter (nm) | $S_{BET}$ (m²/g) | $S_{EXT}$ (m²/g) | $S_{EXT}/S_{BET}$ | $V_{micro}$ (cm³/g) |
|---|---|---|---|---|---|
| Synthesis Example 1 | 30 | 104 | 89 | 0.86 | 0.007 |
| Synthesis Example 2 | 150 | 520 | 190 | 0.37 | 0.130 |

Experimental Example 2

X-ray diffraction analysis for the aluminosilicate particles according to Synthesis Examples 1 and 2 was carried out using an X-ray diffractometer (Bruker AXS D4-Endeavor XRD) under an applied voltage of 40 kV and an applied current of 40 mA. The results are shown in Table 2 below.

The measured range of 2θ was 10° to 90°, and it was scanned at an interval of 0.05°. Herein, a variable divergence slit of 6 mm was used as a slit, and a large PMMA holder (diameter=20 mm) was used to eliminate background noise due to the PMMA holder. Further, a full width at half maximum (FWHM) at a peak of about 29° which is the maximum peak in the 2θ range of 20° to 37° was calculated in the data plot obtained by X-ray diffraction (XRD).

TABLE 2

| | FWHM (°) | $I_{max}$ (°) | Crystal form |
|---|---|---|---|
| Synthesis Example 1 | 6.745 | 29.2 | amorphous |
| Synthesis Example 2 | — | — | FAU-type |

The aluminosilicate particles of Synthesis Example 2 had a FAU (faujasite) crystal structure, so the FWHM measurement was not performed.

Example 1

1.0 g of the amorphous aluminosilicate particles obtained in Synthesis Example 1 was added to 20 ml of mesitylene, and heated to 150° C. while stirring at 500 rpm. 0.08 g of bis(3-triethoxysilylpropyl)tetrasulfide (in 1.5 ml of mesitylene) was added thereto, and the mixture was stirred at 150° C. for 20 minutes.

After completion of the stirring, solids were washed four times by centrifugation using toluene, and dried in an oven at 105° C. for 24 hours to obtain an organic-inorganic composite.

Example 2

An organic-inorganic composite was obtained in the same manner as in Example 1, except that the amorphous aluminosilicate obtained in Synthesis Example 1 was pulverized to have a primary particle diameter of 20 nm or less.

Comparative Example 1

An organic-inorganic composite was obtained in the same manner as in Example 1, except that the crystalline aluminosilicate particles obtained in Synthesis Example 2 were used instead of the amorphous aluminosilicate particles obtained in Synthesis Example 1.

Comparative Example 2

An organic-inorganic composite was obtained in the same manner as in Example 1, except that kaolin clay (product name: Kaolin, manufactured by Sigma-Aldrich) was added instead of the amorphous aluminosilicate particles obtained in Synthesis Example 1.

Control Example

An organic-inorganic composite was obtained in the same manner as in Example 1, except that silica particles (product name: 7000GR, manufactured by Evonik) was added instead of the amorphous aluminosilicate particles obtained in Synthesis Example 1.

Experimental Example 3

The organic-inorganic composites according to Examples 1 and 2, Comparative Examples 1 and 2, and Control Example were subjected to thermogravimetric analysis using a thermogravimetric analyzer (STA 449 F3 Jupiter®, NETZSCH) as follows.

The base value is set by performing three times thermogravimetric analysis at a heating rate of 5° C./min in the range of 30 to 500° C. under an argon gas atmosphere. 10 to 20 mg of the above-mentioned organic-inorganic composite in a powder form was loaded into a special crucible and subjected to thermogravimetric analysis under the same experimental conditions.

Derivative thermogravimetric curves converted from data obtained by the above analysis were obtained from the thermogravimetric analyzer, and are shown in FIG. 1 (Example 1), FIG. 2 (Example 2), FIG. 3 (Comparative Example 1), FIG. 4 (Comparative Example 2), and FIG. 5 (Control Example), respectively.

The peak position (° C.) at which the silane coupling agent is desorbed from the organic-inorganic composite is shown in Table 3 below.

Further, in the derivative thermogravimetric curve, an area (Da) of a region where an x-axis value is 300 to 500° C. and a y-axis value is zero (0) or more was obtained by the thermogravimetric analyzer and shown in Table 3 below.

However, in the case of kaolin clay, weight loss due to hydroxyl groups on a particle surface occurs at 400° C. or higher. Therefore, the Da value for the organic-inorganic composite of Comparative Example 2 to which kaolin clay was applied was limited to a temperature range of 300 to 400° C.

TABLE 3

| | Peak position (°C.) | Da |
|---|---|---|
| Example 1 | 409.7 | 3.88 |
| Example 2 | 413.1 | 4.21 |
| Comparative Example 1 | 432.4 | 2.66 |
| Comparative Example 2 | 372.4 | 2.47 |
| Control Example | 409.4 | 4.50 |

Referring to Table 3, the organic-inorganic composites of Examples 1 and 2 had a Da value of 3.0 or more, and satisfied Equation 1.

On the other hand, the organic-inorganic composites of Comparative Examples 1 and 2 had a Da value of less than 3.0, and thus did not satisfy Equation 1.

Preparation Example 1

737.24 g of a diene elastomer mixture (SSBR 2550, LG Chemical) and 375.32 g of the organic-inorganic composite according to Example 1 as a reinforcing material were added to a closed mixer. After mixing them at 150° C. for 5 minutes, 78.66 g of other additives (antioxidant, emulsifier, vulcanization accelerator, wax, etc.) were added thereto and mixed for 90 seconds.

The resulting mixture was extruded in the form of a sheet having a thickness of 2 to 3 mm, and vulcanized at 160° C. to obtain a rubber molded product. At this time, the vulcanization time was controlled referring to data obtained by measuring the above mixture at 160° C. using a moving die rheometer (MDR).

Preparation Example 2

A rubber molded product was obtained in the same manner as in Preparation Example 1, except that the organic-inorganic composite according to Example 2 was added as a reinforcing material.

Preparation Example 3

A rubber molded product was obtained in the same manner as in Preparation Example 1, except that the organic-inorganic composite according to Comparative Example 1 was added as a reinforcing material.

Preparation Example 4

A rubber molded product was obtained in the same manner as in Preparation Example 1, except that the organic-inorganic composite according to Comparative Example 2 was added as a reinforcing material.

Preparation Example 5

A rubber molded product was obtained in the same manner as in Preparation Example 1, except that the organic-inorganic composite according to Control Example was added as a reinforcing material.

Experimental Example 4

The relative volume loss index was measured according to DIN ISO 4649 using an abrasion tester (Bareiss GmbH) for the rubber molded products according to Preparation Examples 1 to 5.

The relative volume loss index was calculated by the following equation for the rubber molded products of Preparation Examples 1 to 4, after determining the rubber molded product of Preparation Example 5 including the organic-inorganic composite of Control Example as a reference material.

The relative volume loss index={[(the relative volume loss of Preparation Example 5)−(the relative volume loss of the corresponding Preparation Example)]/[the relative volume loss of Preparation Example 5)×100]}+100

TABLE 4

| | Relative volume loss index (%) |
|---|---|
| Preparation Example 1 | 86 |
| Preparation Example 2 | 89 |
| Preparation Example 3 | 37 |
| Preparation Example 4 | 24 |
| Preparation Example 5 | 100 |

Referring to Table 4, it was confirmed that the rubber molded products of Preparation Examples 1 and 2 to which the organic-inorganic composite of Example 1 or 2 was applied exhibited excellent abrasion resistance of twice or more as compared with the rubber molded products of Preparation Examples 3 and 4 to which the organic-inorganic composite of Comparative Example 1 or 2 was applied.

The invention claimed is:

1. An organic-inorganic composite for rubber reinforcement, comprising:
   amorphous aluminosilicate particles having a composition of the following Chemical Formula 1, and
   a silane-based coupling agent bonded to at least a part of a surface of aluminosilicate particles,
   wherein the organic-inorganic composite satisfies the following Equation 1:

$$M_{x/n}[(AlO_2)_x(SiO_2)_y] \cdot m(H_2O) \quad \text{[Chemical Formula 1]}$$

wherein, in Chemical Formula 1,
M is an element selected from the group consisting of Li, Na, K, Rb, Cs, Be, and Fr, or an ion thereof;
x>0, y>0, n>0, and m≥0;
1.0≤y/x≤10.0; and
0.01≤x/n≤1.2;

$$Da \geq 3.0 \quad \text{[Equation 1]}$$

wherein, in Equation 1,
Da is an area under a derivative thermogravimetric curve over a temperature range of 300° C. to 500° C., wherein the derivative thermogravimetric curve is in units weight reduction percent of the organic-inorganic composite relative to temperature (%/° C.), and
wherein the derivative thermogravimetric curve is obtained from thermogravimetric analysis (TGA) of the organic-inorganic composite, wherein, in TGA, weight of the organic-inorganic composite is measured as a function of temperature over a temperature ranging from 30° C. to 500° C.

2. The organic-inorganic composite for rubber reinforcement of claim 1,
   wherein the amorphous aluminosilicate particles have an average particle diameter of 10 to 100 nm, a Brunauer-Emmett-Teller surface area ($S_{BET}$) of 80 to 250 m²/g, and an external specific surface area (SExT) of 60 to 200 m²/g according to an analysis of nitrogen adsorption/desorption.

3. The organic-inorganic composite for rubber reinforcement of claim 1,
   wherein the silane-based coupling agent is at least one compound selected from the group consisting of bis(3-triethoxysilylpropyl) tetrasulfide, bis(2-triethoxysilylethyl) tetrasulfide, bis(4-triethoxysilylbutyl) tetrasulfide, bis(3-trimethoxysilylpropyl) tetrasulfide, bis(2-trimethoxysilylethyl) tetrasulfide, bis(4-trimethoxysilylbutyl) tetrasulfide, bis(3-triethoxysilylpropyl) trisulfide, bis(2-triethoxysilylethyl) trisulfide, bis(4-triethoxysilylbutyl)

trisulfide, bis(3-trimethoxysilylpropyl) trisulfide, bis(2-trimethoxysilylethyl) trisulfide, bis(4-trimethoxysilylbutyl) trisulfide, bis(3-triethoxysilylpropyl) disulfide, bis(2-triethoxysilylethyl) disulfide, bis(4-triethoxysilylbutyl) disulfide, bis(3-trimethoxysilylpropyl) disulfide, bis(2-trimethoxysilylethyl) disulfide, bis(4-trimethoxysilylbutyl) disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropyl benzothiazole tetrasulfide, 3-trimethoxysilylpropyl methacrylate monosulfide, and 3-trimethoxysilylpropyl methacrylate monosulfide.

4. A method for preparing an organic-inorganic composite for rubber reinforcement, comprising:

mixing and heating amorphous aluminosilicate particles and an organic solvent to a temperature ranging from 130 to 150° C. to prepare a heated mixture, wherein the amorphous aluminosilcate particles have a composition represented by Chemical Formula 1;

adding a silane-based coupling agent to the heated mixture and stirring for 10 to 60 minutes to form an organic-inorganic composite having the silane-based coupling agent bound to at least a part of a surface of the amorphous aluminosilicate particles; and washing and drying the organic-inorganic composite, wherein the organic solvent having a boiling point of 150° C. or higher and not reactive with the amorphous aluminosilcate particles and the silane-based coupling agent, wherein the organic-inorganic composite satisfies the following Equation 1:

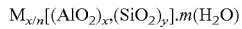  [Chemical Formula 1]

wherein, in Chemical Formula 1,

M is an element selected from the group consisting of Li, Na, K, Rb, Cs, Be, and Fr, or an ion thereof;

x>0, y>0, n>0, and m≥0;

1.0≤y/x≤10.0; and 0.01≤x/n≤1.2;

$$Da \geq 3.0 \qquad \text{[Equation 1]}$$

wherein, in Equation 1,

Da is an area under a derivative thermogravimetric curve over a temperature range of 300° C. to 500° C., wherein the derivative thermogravimetric curve is in units weight reduction percent of the organic-inorganic composite relative to temperature (%/° C.), and wherein the derivative thermogravimetric curve is obtained from thermogravimetric analysis (TGA) of the organic-inorganic composite, wherein, in TGA, weight of the organic-inorganic composite is measured as a function of temperature over a temperature ranging from 30° C. to 500° C.

5. The method for preparing the organic-inorganic composite for rubber reinforcement of claim 4, wherein a weight ratio of the amorphous aluminosilicate particles and the silane-based coupling agent ranges from 1:0.01 to 1:0.5.

6. The method for preparing the organic-inorganic composite for rubber reinforcement of claim 4, wherein the organic solvent is at least one compound selected from the group consisting of mesitylene, indane, tetralin, limonene, decane, undecane, and dodecane.

7. A rubber composition for tires, comprising:

the organic-inorganic composite for rubber reinforcement of claim 1; and at least one diene elastomer.

8. The rubber composition for tires of claim 7, wherein the diene elastomer is at least one compound selected from the group consisting of a natural rubber, polybutadiene, polyisoprene, a butadiene/styrene copolymer, a butadiene/isoprene copolymer, a butadiene/acrylonitrile copolymer, an isoprene/styrene copolymer, and a butadiene/styrene/isoprene copolymer.

* * * * *